Oct. 8, 1963   I. TURINSKY   3,106,078
DRIVE COUPLING
Filed March 26, 1962
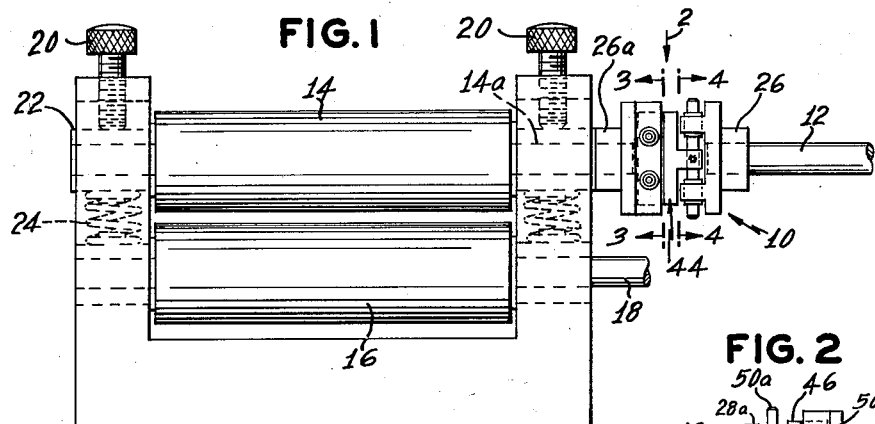
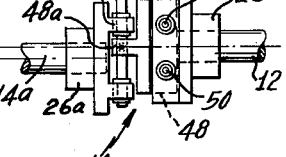
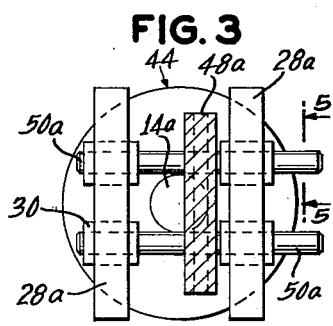
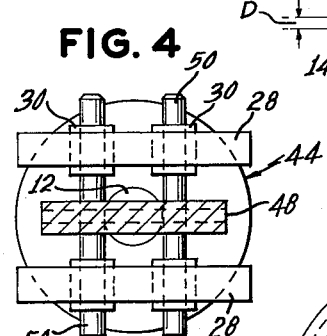
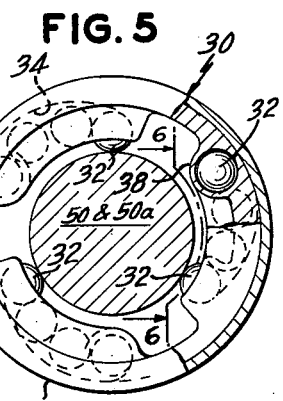
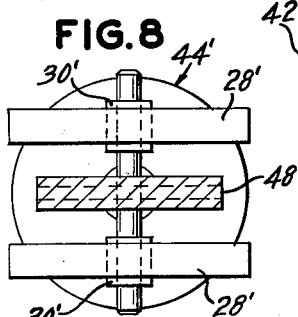
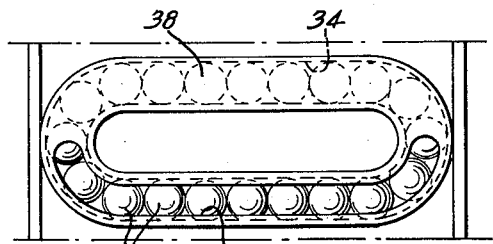
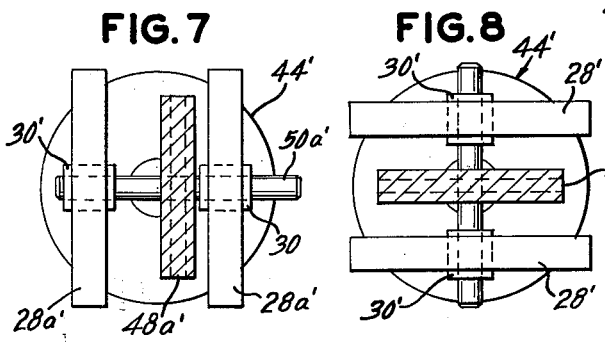
INVENTOR.
ISIDORE TURINSKY
BY
Paul S Martin
ATTORNEY

United States Patent Office 3,106,078
Patented Oct. 8, 1963

3,106,078
DRIVE COUPLING
Isidore Turinsky, North Babylon, N.Y., assignor to Slant/Fin Radiator Corporation, Richmond Hill, N.Y., a corporation of New York
Filed Mar. 26, 1962, Ser. No. 182,517
5 Claims. (Cl. 64—31)

The present invention relates to drive couplings for transmitting rotary drive from one shaft to another.

An object of this invention resides in the provision of a novel drive coupling unit for transmitting continuous rotary drive from one shaft to another, where such shafts are misaligned or offset at times in their operation.

A related object is to provide a drive coupling unit that is capable of transmitting relatively large driving torque, and which is nonetheless relatively compact considering the duty required.

A further object of the invention resides in novel features of construction of a drive coupling of the foregoing character, promoting long life and smooth, continuous drive that is free of "play" or looseness between driving and driven parts that has been a problem in many couplings of this type known heretofore.

The foregoing objects and others that will become apparent, are achieved by the illustrative embodiment of the invention and a modification, which are described in detail below. As will be seen, the preferred embodiment includes confronting coupling plates fixed to the respective shafts to be coupled together. Between the shafts there is a cross-ribbed coupling member having respective bars or ribs across opposite faces thereof, the ribs extending at right angles to each other. Each coupling plate fixedly carries a pair of bearing blocks at opposite sides of a respective rib and spaced therefrom. A pair of spaced-apart rods are fixed in each said rib and extend from such rib in opposite directions to and through bearings in the corresponding bearing blocks. These bearings include plural endless-race ball-bearing units, and are installed in a manner that is free of looseness or "play" between the rod and the bearing block.

The rods of each pair are spaced apart at opposite sides of the center of the cross-rib member, and the bearings that receive the rods are located still farther from the center of the cross-rib member. Because of the foregoing arrangement, stress concentrations are minimized. And by virtue of the particular ball-bearing units provided, "play"-free and long-wearing operation is insured. The resulting performance is highly successful, and the coupling is well suited to the purpose described. Further, the parts are capable of being assembled successfully without undue precision, and the drive coupling is available for use as a drive unit, for assembly to other apparatus as required.

The nature of the invention, including the foregoing objects and features of novelty, will be better appreciated from the following detailed description of the presently preferred embodiment of the invention and a modification, shown in the accompanying drawings. In the drawings:

FIG. 1 is an elevation of a pair of feed rolls having a presently preferred form of drive coupling in accordance with the present invention;

FIG. 2 is a top plan view of the coupling in FIG. 1 as seen from the arrow 2 in FIG. 1;

FIGS. 3 and 4 are vertical cross-sections as viewed from the planes 3—3 and 4—4 in FIG. 1, FIGS. 3 and 4 being drawn to larger scale;

FIG. 5 is an end view of a bearing, as seen from the line 5—5 in FIG. 3 but drawn to larger scale; portions of the bearing being broken away and shown in section for clarity;

FIG. 6 is an internal view of a portion of the bearing in FIG. 5 as seen from the line 6—6 in FIG. 5; and FIGS. 7 and 8 are views corresponding to FIGS. 3 and 4, illustrating a modification of the drive coupling in FIGS. 1 to 4.

Referring now to the drawings and particularly to the embodiment in FIGS. 1–6 inclusive, a novel drive coupling 10 is shown having a drive-shaft 12 connected to a motor (not shown). Coupling 10 is intended to drive the top roll 14 of a pair of rolls 14 and 16. The latter has a shaft 18 which may extend to the same motor as that which drives shaft 12. The separation between the surfaces of rolls 14 and 16 is diagrammatically shown as being adjustable by means of screws 20 that bear against bearing blocks 22 for the stub shafts that support the ends of roll 14. Springs 24 bias bearing blocks 22 against the respective screws 20.

Rolls 14 and 16 are the same diameter and it is accordingly important that they be operated constantly at the same surface speed for properly feeding a strip of metal or the like that is gripped between them. Strips of different thicknesses may be fed at different times, and this is taken into account by adjustment of screws 20. Such adjustment should not interfere with the drive of the rolls 14 and 16. Furthermore, it becomes necessary to separate the rolls at times, as when a new strip is being threaded; and at such times it is desirable to raise roll 14 substantially without interrupting its mechanical connection to its driveshaft 12. Coupling 10 is interposed between shaft 12 and roll 14 for maintaining the drive connection between the two, and for providing the required continuous drive from shaft 12 despite varying degrees of offset of the axis of roll 14 in relation to shaft 12.

Shaft 12 carries a coupling plate 26. This plate carries a pair of parallel blocks 28, integrally, and in each of these blocks there is fixed a pair of axial-race ball-bearing units 30. The shaft of feed roll 14 carries a similar coupling plate 26a with its various blocks 28a and axial-race ball-bearing units 30a.

These axial-race ball-bearing units are shown enlarged in FIGS. 5 and 6. Shaft 12 bears against three rows of exposed ball-bearings 32. These ball-bearings are contained in an endless race 34 in which the ball-bearings can circulate. Race 34 includes a slot 36 at which a straight row of ball-bearings is exposed for bearing contact with rod 50. The return-path-portion 38 of the race is spaced away from the surface of shaft 50. The row of ball-bearings exposed by race portion 36 (FIG. 6) bears against rod 50 along a line that is parallel to the axis of this rod. Three such axial lines of bearings 32 (FIG. 5) provide bearing engagement at 120-degree spacing about rod 50.

The ball-bearing unit includes cage 40 that is discontinuous at a gap 42. As a result of this detail, it is possible to adjust the size of the bearing unit 30 so that bearings 32 can bear directly and without play against the surface of rod 50. Bearing unit 30 is received in bores in block 28 of precise size to compress the ball-bearing unit so that the exposed ball-bearings 32 act without "play" against the shaft surface. If desired, blocks 28 may be formed to provide split sections (not shown) and clamped together by screws for tightly gripping the exterior of bearing 30 and thereby establishing the desired bearing pressure of the balls 32 against shaft 12.

Between coupling plates 26 and 26a there is a cross-rib member 44 that has a circular body portion 46 and two bars or ribs 48 and 48a. These bars are at opposite sides of disc 46 and the bars are at right-angles to each other.

A pair of rods 50 are received tightly in corresponding bores in bar or rib 48, and they are fixed in position by set screws or other fastening means. Each end of each rod 50 extends into and beyond a respective bearing 30 in one of the blocks 28 previously described. By like token, the pair of rods 50a that are fixed in rib 48a have their respective ends received in further axial-race ball-bearing units 30 in blocks 28a.

Fixed shaft 12 and feed roll 14 are shown in FIG. 1 as having their axes in alignment, as viewed horizontally. By raising or lowering the roll 14, for accommodating different thicknesses of strip or for facilitating threading of a strip, screws 20 may be adjusted. This would introduce an offset between the axes of feedroll 14 and drive shaft 12, but the drive transmission is not disrupted.

In FIG. 2, shaft 14a is shown, this being the shaft extension of roll 14. Shaft 14a is shown offset by a distance D from the axis of shaft 12, for purposes of discussion. In the apparatus of FIG. 1, the axes of shaft 12 and feed roll 14 would ordinarily be adjusted to lie in a common vertical plane. However, FIG. 2 will aid in the description of how coupling 10 operates.

In the configuration of the parts represented in FIG. 2, rib 48a of member 46 is disposed above the axis of shaft 14a, relatively close to that block 28a above rib 48a. When a half-rotation of shaft 12 has taken place, the parts will look the same as shown in FIG. 2, but the opposite block 28a will be disposed close to rib 48a. During this process, shafts 50 which are carried by ribs 48a are caused to slide in the bearing units 30 that receive them, thus moving in a reciprocating stroke in these bearings during shaft rotation.

If shaft 12 were to rotate a quarter-revolution from the position illustrated in FIG. 2, then rib 48 which carries rods 50 would appear relatively close to the upper block 28. Accordingly, rods 50 slide in their bearing units 30 in the same manner as was described in connection with rods 50a and their bearings 30.

Rotation of shaft 12 transmits continuous rotation to shaft 14a, smoothly and without "play" such as has characterized previous coupling units of this type. By virtue of the connection of the two rods 50 to rib 48 at points that are spaced apart substantially, at opposite sides of the center of member 44, there is a minimum of stress concentration where the rods extend through rib 48. Further, the sliding motion of rods 50 in bearings 30 occurs at a substantial radius from the axis of the drive shaft and the driven shaft, and this further contributes to the strength and "play"-less character of the coupling unit.

The drive-coupling unit described may be assembled and checked as a unit; and in this condition it can be stocked for later use and installation as a unit where required.

The lateral separation of rods 50 in bars or ribs 48 provides a considerable measure of strength, to transmit the driving torque effectively. Where the torque developed is small, it may be feasible to reduce the number of rods 50 and the number of bearings 30 by half. This modification is illustrated in FIGS. 7 and 8. The parts in these figures are designated with primed numerals corresponding to those in FIGS. 1–6. Their nature and operation are believed self-evident, so that the detailed description is omitted as unnecessary.

It is evident that additional modifications and variations of the foregoing will occur to those skilled in the art. Consequently, this invention should be construed broadly, in a manner consistent with its full spirit and scope.

What is claimed is:

1. A drive coupling for transmitting rotary drive from a first shaft to another shaft whose axis may be offset from that of said first shaft, said drive coupling including first and second coupling plates adapted to be secured to such shafts, each said coupling plate fixedly carrying a pair of bearing blocks spaced apart at opposite sides of the shaft axis, a cross-rib member interposed between said coupling plates and having projecting ribs at opposite sides thereof, said ribs being at right angles to each other and each said rib extending into and only partly filling the space between the pair of bearing blocks on a respective one of said coupling plates, a pair of parallel rods fixed in each of said ribs and each pair of rods being laterally spaced apart and disposed at opposite sides of the center of said transverse-rib member, said rods extending in opposite directions through and beyond said bearing blocks, and a bearing in each block tightly but slidably receiving a respective end of one of said rods, each said bearing including plural endless ball-bearing races each having an exposed line of ball-bearings extending parallel to the axis of the rod engaged thereby.

2. A drive coupling for transmitting rotary drive from a first shaft to another shaft whose axis may be offset from that of said first shaft, said drive coupling including first and second coupling plates adapted to be secured to such shafts, and a cross-rib member interposed between said plates, each said coupling plate fixedly carrying a pair of bearing blocks spaced apart at opposite sides of the shaft axis, said cross-rib member having projecting ribs at opposite sides thereof, said ribs being at right angles to each other and each said rib extending into and only partly filling the space between the pair of bearing blocks on a respective one of said coupling plates, at least one rod fixed at its midpoint in each of said ribs, each said rod extending in opposite directions through and beyond the corresponding bearing blocks, and a bearing in each block tightly but slidably receiving a respective rod end and each said bearing including plural endless ball-bearing races each having an exposed line of ball bearings extending parallel to the axis of the rod engaged thereby.

3. A drive coupling for transmitting rotary drive from a first shaft to another shaft whose axis may be offset from that of said first shaft, said drive coupling including first and second coupling plates adapted to be secured to such an intermediate member interposed between said coupling plates, said first plate and said intermediate member having confronting faces, a bar on one of said faces and a pair of bearing blocks on the other of said faces at opposite sides of said bar and spaced therefrom, a pair of parallel rods fixed in said bar and said pair of rods being disposed at opposite sides of the center of said intermediate member, said rods extending in opposite directions through and beyond said bearing blocks, and a bearing in each block tightly but slidably receiving a respective end of one of said rods and each said bearing including plural endless ball-bearing races each having an exposed line of ball-bearings extending parallel to the axis of the rod engaged thereby, said second plate and said intermediate member also having confronting faces provided with like bearing blocks, bearings, rods and a bar arranged as aforesaid, the rods between said second plate and said intermediate plate being perpendicular to the first-mentioned rods but in a different plane.

4. A drive coupling for transmitting rotary drive from a first shaft to another shaft whose axis may be offset from that of said first shaft, said drive coupling including first and second coupling plates adapted to be secured to such shafts, an intermediate member interposed between said coupling plates, said first plate and said intermediate member having confronting faces, a bar on one of said faces and a pair of bars on the other of said faces at opposite sides of said first-mentioned bar and spaced therefrom, a pair of parallel rods fixed in one of said bars and said pair of rods being disposed at opposite sides of the center of said intermediate member, said rods extending in opposite directions through said pair of bars, and a bearing in at least one of said bars tightly but slidably receiving a respective one of said rods, and each said bearing including plural endless ball-bearing races each having an exposed line of ball-bearings extending parallel to the axis of the rod engaged thereby, said second plate and said intermediate member also having confronting faces provided with like bars, rods and bearings arranged as aforesaid, the rods between said second plate and said intermediate plate being perpendicular to the first-mentioned rods but in a different plane.

5. A drive coupling for transmitting rotary drive from a first shaft to another shaft whose axis may be offset from that of said first shaft, said drive coupling including first and second coupling plates adapted to be secured to such shafts, an intermediate member interposed between said coupling plates, said first plate and said intermediate member having confronting faces, a bar on one of said faces and a pair of bars on the other of said faces at opposite sides of said first-mentioned bar and spaced therefrom, at least one rod fixed in one of said bars of only one of said faces and extending through all said bars, means forming a tight but slidable bearing for said one rod in each bar of the other of said faces, said second coupling plate and said intermediate member also having confronting faces provided with like bars, bearing-forming means, and at least one rod arranged as aforesaid, the rod between said second plate and said intermediate member being perpendicular to the first-mentioned rod but in a different plane.

References Cited in the file of this patent
UNITED STATES PATENTS

| | | |
|---|---|---|
| 1,027,520 | Blood | May 28, 1912 |
| 1,377,663 | Brown et al. | May 10, 1921 |
| 1,411,468 | Wood | Apr. 4, 1922 |
| 2,333,611 | Wolf | Nov. 2, 1943 |
| 2,491,364 | Earl | Dec. 13, 1949 |
| 2,932,255 | Neukirch | Apr. 12, 1960 |